United States Patent

[11] 3,605,092

[72] Inventor Harold S. Richard
Dayton, Ohio
[21] Appl. No. 3,689
[22] Filed Jan. 19, 1970
[45] Patented Sept. 14, 1971
[73] Assignee The National Cash Register Company
Dayton, Ohio

[54] MAGNETIC INK CHARACTER RECOGNITION SYSTEM
15 Claims, 3 Drawing Figs.

[52] U.S. Cl. .......... 340/146.3 C
[51] Int. Cl. .......... G06k 9/00
[50] Field of Search .......... 333/29; 250/219 CR; 340/146.3

[56] References Cited
UNITED STATES PATENTS

| | | | |
|---|---|---|---|
| 2,924,812 | 2/1960 | Merritt et al. .......... | 340/146.3 |
| 3,168,720 | 2/1965 | Eckert .......... | 340/146.3 |
| 3,264,609 | 8/1966 | Scheidhauer .......... | 340/146.3 |
| 3,270,320 | 8/1966 | Christie .......... | 340/146.3 |

*Primary Examiner*—Thomas A. Robinson
*Attorneys*—Louis A. Kline, John J. Callahan and Harry W. Barron

ABSTRACT: A triggering circuit is provided with an MICR character reader which enables the character recognition circuits during the time the analog waveform provided by a transducer reading head is properly positioned in a tapped delay line. The triggering circuit is responsive to the signals appearing at certain of the tapped outputs of the delay line, and a comparator included therein allows the character recognition circuits to be enabled when the voltage at the most delayed tap is a certain percent of the highest voltage appearing at the other taps coupled to the triggering circuit.

INVENTOR
HAROLD S. RICHARD
Louis A. Kline
BY John J. Callahan
Harry W. Barron
HIS ATTORNEYS INVENTOR
HAROLD S. RICHARD
BY Louis A. Kline
John J. Callahan
Harry W Barron
HIS ATTORNEYS

MAGNETIC INK CHARACTER RECOGNITION SYSTEM

This invention relates to a Magnetic Ink Character Recognition (MICR) character reading system and more particularly to means for enabling that system to recognize a particular character at the proper time.

In a state-of-the-art MICR character reader, a document having ink imprinted thereon which is capable of being magnetized is passed across a magnet and thereafter scanned by a transducer head. The head delivers a signal having an instantaneous magnitude corresponding to the derivative of the amount of magnetized ink along the portion of the character then being scanned. The signal from the head is applied to a delay line which has a plurality of intermediate tapped outputs, and the signal appearing at each of the tapped outputs of the delay line is delayed version (which may be attenuated) of the head signal, with the amount of delay between successive tapped output being constant.

The signals from each one of the tapped outputs are applied to each one of a number of character recognition circuits, there being a character recognition circuit for each of the different characters on the document which is to be recognized. Thus, for instance, if a bank check is to be read, there would be 14 character recognition circuits, one for each of the numbers 0 through 9 and one for each of the four coded character reference numbers. Each of character recognition circuits will provide a signal at its output whenever a matrix system included therein recognizes a particular character waveform in the delay line. Such a system is described in U.S. Pat. No. 2,924,812, which issued Feb. 9, 1960, on the application of Philip E. Merritt and Carroll M. Steele.

It is important that the character recognition circuits be enabled to recognize the character only when the waveform is properly positioned in the delay line; otherwise the wrong character can be recognized. Thus, it is necessary to incorporate some type of a triggering or timing circuit which enables the character recognition circuits for a given time only when the waveform is properly positioned in the delay line.

One manner of achieving this type of triggering circuit is illustrated in the above-noted Merritt et al. United States patent. There, at the time the leading edge of the wave begins to enter the delay line, a first monostable multivibrator is triggered. This multivibrator has a time constant which corresponds to the time necessary for the entire wave to travel into the delay line. The trailing edge of the first multivibrator signal triggers a second monostable multivibrator signal triggers a second monostable multivibrator, which provides an enabling signal that enables each of the character recognition circuits to be able to recognize which character the waveform corresponds to.

A second manner in which the proper triggering time is achieved is to wait until the leading edge has reached a certain point in the delay line. Circuitry is provided for determining whether the magnitude of the waveform at this point exceeds a certain value, which may be about one sixth of the maximum magnitude. As long as this magnitude exists, the character recognition circuits will be enabled and will thus be able to recognize a character.

Both of these methods of enabling the character recognition circuits depend upon the leading edge of the waveform reaching a certain point, and thus the problem of false leading edges exists in both. If, for instance, an unwanted ink spot or a piece of dust or dirt, which is on the document preceding the character being read, becomes magnetized, the leading edge of the particular character will be false; that is, the leading edge will correspond to the ink spot or to the piece of dirt and not to the beginning of the character being read. When this occurs, the false leading edge will cause the character recognition circuits to be enabled prior to the proper time. Another cause of this problem exists when it is necessary to put a new number on a check. This is done by printing the new number on a sticker which is pasted over the old number. In this event, the transducer head will read the new number as well as an attenuated version of the old number. If the sticker is not placed directly over the old number, it is possible that the attenuated leading edge of the old number will appear as the leading edge of the signal being read, and this will cause the triggering circuit to enable the character recognition circuits at an early time.

In accordance with one preferred embodiment of this invention, there is provided a combination which includes a tapped delay line responsive to the application thereto of an input signal which advances through the delay line and causes signals to appear at tapped outputs thereof which are delayed versions of the input signal. There is further included gating means responsive to the signals appearing at certain of the tapped outputs of the delay line, for providing the one of those signals having the greatest magnitude to appear at its output. Further, means are included for comparing the signal at the output of the gating means with a signal at another one of the tapped outputs of the delay line and for providing a signal when the ratio between these compared signals arrives at a predetermined value.

A specific embodiment of the invention is described hereinafter, where reference will be made to the following FIGURES, in which.

Figure 1:
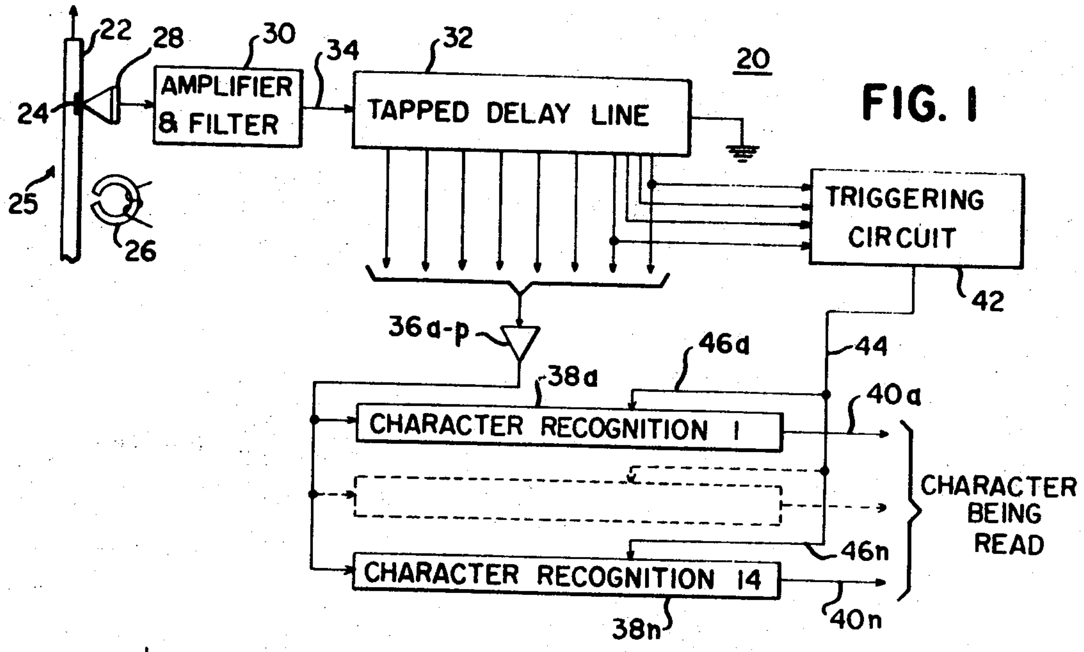
FIG. 1 represents the block diagram circuit of an MICR character reader.

Referring now to FIG. 1, there is shown an MICR character reading circuit 20. A character 24, written in ink capable of being magnetized, is imprinted on a document 22, which is passed through a reading station 25 in the direction indicated by the arrow. The character 24 is first passed adjacent to a magnet structure 26, which magnetizes the ink of the character, and, shortly thereafter, the magnetized character 24 is scanned by a transducer reading head 28, which provides an analog signal corresponding to the character. The signal from the transducer head 28 is actually the change in the magnetic flux with respect to time of the total amount of ink across a given direction as the character 24 is scanned by the head 28. In practice, the document 22 would have many characters similar to the character 24 on it, and the signal from the head 28 would be a series of analog signals each of which corresponds to one character.

The output signal from the head 28 is applied to an amplifying and filtering network 30. The filter is so set that only signals having a certain maximum frequency can be applied to an output thereof.

The output from the amplifying and filtering network 30 is applied to a reflection-free tapped delay line 32 through a line 34. The delay line 32 in this embodiment has eight equally spaced successive tapped outputs T1, T2, T3, T4, T5, T6, T7, and T8 and a number of intermediate tapped outputs, two of which, T7–⅓ and T7–⅔, are shown here and are positioned between the tap T7 and the tap T8. In practice, there would be a positive output and a negative output from each of the taps T1, T2, T3, T4, T5, T6, T7, and T8. The taps are so positioned on the delay line that they each delay the input signal by 43.3 microseconds; thus, the output signal from the tap T1 is a version of the input signal which is delayed by 43.3 microseconds; the output signal from the tap T2 is a version of the input signal which is delayed by 86.6 microseconds; and so forth until the output signal from the tap T8 is a version of the input signal which is delayed by 346.4 microseconds. It should be noted that the outputs at the various taps T1 through T8 of the delay line 32 will have substantially the same shape as the analog signal, but will be attenuated due to the delay line.

The positive and negative tapped outputs from the delay line 32 are each applied to one of the 16 amplifiers 36*a–p*, which are represented in FIG. 1 as a single amplifier. Each of these amplifiers is set to have a gain which compensates for the attenuation due to the delay line. The output from each of the amplifiers 36a–p is applied to each one of the fourteen character recognition circuits 38a–n. Each of character recognition circuits 38a–n is designed to recognize one of the 14 different types of characters which can be read by the head 28. When one of the character recognition circuits 38a–p is enabled and recognizes the signal which then appears in the delay line 32, an output signal appears at the one of the output lines 40a–n corresponding to that character recognition circuit. This output signal will hereinafter be referred to as a "null" because the particular circuitry (not shown) in each of the character recognition circuits 38a–n is such that, when the analog signal is properly positioned in the delay line 32, the one of the character recognition circuits 38a–n which recognizes that signal will provide a minimum voltage at its output 40a–n. Means (not shown) is included for allowing the one of the outputs 40a–n from the character recognition circuits 38a–n to be applied to apparatus (not shown), such as a sorter or a computer, and to operate that apparatus in the manner desired.

The output signals appearing at the taps T7 and T8 of the delay line 32, as well as the two intermediate taps T7–⅓ and T7–⅔, are applied to a triggering circuit 42. It is the function of the triggering circuit 42 to enable each of the character recognition circuits 38a–n during the same given time, so that they will, during that time, be able to identify the analog single in the delay line as a particular character. It is necessary for that portion of the waveform corresponding to the character 24 to be properly positioned in the delay line to get a valid recognition by one of the character recognition circuits 38a–n. Thus, the triggering circuit 42 must be designed to enable the character recognition circuits 38a–n only during the time in which the waveform is properly positioned in the delay line 32.

Figure 2:
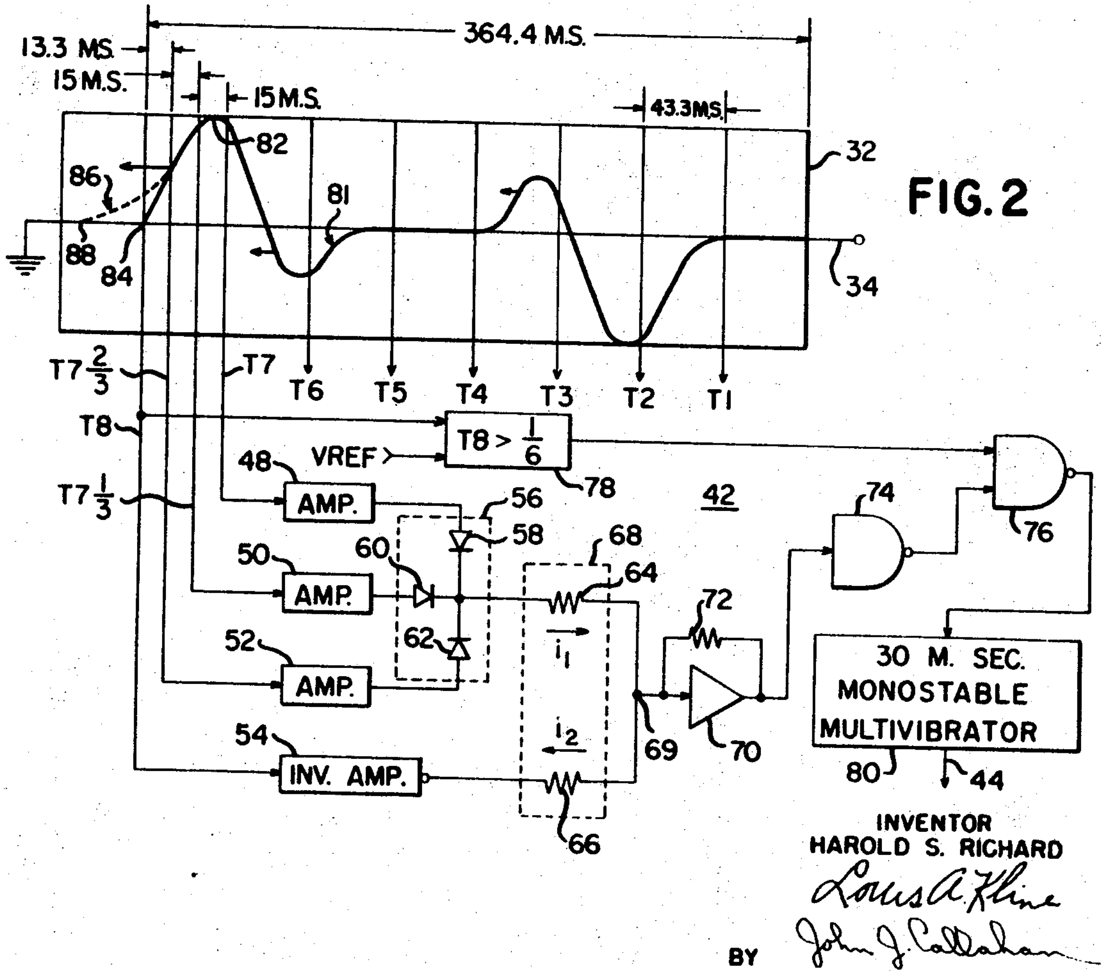
FIG. 2 represents a more detailed block diagram of the delay line and the triggering circuit shown in FIG. 1.

Referring now to FIG. 2, there is shown in more detail the combination of the tapped delay line 32 and the triggering circuit 42. As explained above, the delay between the taps T7 and T8 is 43.3 microseconds, In this embodiment, the delay between the taps T7 and T7–⅓ can be set at 15 microseconds, between the taps T7–⅓ and T7–⅔ at 15 microseconds, and between the taps T7–⅔ and T8 at 13.3 microseconds.

The tap T7 is coupled to a noninverting amplifier 48, the tap T7–⅓ is coupled to a noninverting amplifier 50, and the tap T7–⅔ is coupled to a noninverting amplifier 52. The signal appearing at the tap T8 is applied to an inverting amplifier 54. The gain of the amplifiers 48, 50, 52, and 54 is adjusted to compensate for the attenuation which occurs in the delay line 32, up to the point of the tap with which each is associated.

The output signals from the amplifiers 48, 50, and 52 are applied to an OR gate 56, which provides a signal to its output that is the equivalent in magnitude to the one of the signals applied thereto having the greatest magnitude above ground. The OR gate 56 may simply include three diodes 58, 60, and 62, each of which has an anode and a cathode. The anodes of the three diodes 58, 60, and 62 are each coupled to the output of a respective one of the amplifiers 48, 50, and 52, and the cathodes of the three diodes 58, 60, and 62 are each coupled together as the output of the OR gate 56. The OR gate 56 operates in such a manner that the signal from the one of the amplifiers 48, 50 and 52 having the greatest magnitude above ground forward-biases the diode connected to that one amplifier and reverse-biases the other two diodes. Thus, the output of the OR gate 56 is the instantaneous value of a positive peak out of an amplifier 48, 50, or 52, whichever is greatest.

The output of the OR gate 56 is connected to a resistor 64 and supplies a current $i_1$ to the resistor 64 flowing in the direction indicated by the arrow. The output of the amplifier 54 is connected to a resistor 66, and, since the amplifier 54 is of the inverting type, it causes a current $i_2$ to flow through the resistor 66 in a direction opposite to the direction of the current $i_1$, as indicated by the arrow. resistors 64 and 66 constitute a ratio-determining network 68, the exact operation of which will be explained hereinafter.

The ends of the resistors 64 and 66 which are remote from the gate 56 and the amplifier 54 are connected together at a point 69 and to the input of an operational amplifier 70. A resistor 72 is connected in parallel between the output of the operational amplifier 70 and the point 69. The operational amplifier 70 is so designed that the pint 69 remains at ground potential. Thus the diodes 58, 60, and 62 will be reverse-biased for negative excursions of the analog waveform. When the current $i_2$ becomes greater than the current $i_1$, the amplifier 70 and the resistor 72 act to provide a high signal at the output of the amplifier 70; otherwise they provide a low signal.

The current $i_1$ is determined by the magnitude of the one of the voltages which appear at the taps T7, T7–⅓, and T7–⅔ that as the maximum magnitude divided by the value of the resistor 64, and the current $i_2$ is determined by the magnitude of the voltage appearing at the tap T8 divided by the value of the resistor 66. By properly selecting the values of the resistors 64 and 66 in the ratio-determining network 68, one can cause the amplifier 70 to provide a signal indicating the time when the instantaneous magnitude of the analog waveform which occurs at the tap T8 becomes a certain percent of the largest of the instantaneous magnitudes of the analog waveforms which occur at the taps T7, T7–⅓, or T7–⅔. Thus, if the ratio of the resistor 66 to the resistor 64 is set at X, the current $i_1$ will be greater than the current $i_2$ as long as the ratio of the magnitude of the signal at the tap T8 to the larger of the magnitudes of the signals at the taps T7, T7–⅓, or T7–⅔ is less than X. In this event, the amplifier 70 provides a low potential signal. However, as soon as the magnitude of the signal at the tap T8 becomes large enough so that the ratio of the tap T8 magnitude to the larger of the magnitudes at the taps T7, T7–⅓, or T7–⅔ exceeds X, the current $i_2$ will exceed the current $i_1$, and the amplifier 70 will provide a high potential output signal. In practice, the low potential signal may be −8 volts, and the high potential signal may be 0 volts.

The output of the amplifier 70 is coupled to an inverter circuit 74, which inverts the amplifier 70 output signal. The output of the inverter circuit 74 is coupled to one input of two input NAND gate 76. A NAND gate is a circuit, well known in the art, which provides a high signal when both input signals are low and a low signal otherwise.

The tap T8 is further connected to a T8>1/6 comparator circuit 78, which provides a high signal whenever the magnitude of the voltage appearing at the tap T8 is less than 1/6 of a reference voltage $V_{ref}$ and a low signal whenever the magnitude of the voltage appearing at the tap T8 is greater than 1/6 of the reference voltage $V_{ref}$. The reference voltage $V_{ref}$ may be the maximum voltage at any of the taps T1 to T7. The output of the comparator circuit 78 is applied as the second input of the NAND gate 76. The output of the NAND gate 76 is applied to a trigger input of a triggerable monostable multivibrator 80. Whenever the output of the NAND gate 76 goes low, the multivibrator 80 is triggered, and it, in turn, provides a pulse on a line 44 having a duration fixed by its internal R-C time constant.

The duration of the pulse on the line 44 should be selected to be between 25 and 35 microseconds, and the ratio of the resistor 66 to the resistor 64 should be selected to be between 0.60 and 0.70 where the OR gate 56 has three inputs, as described herein. In one specific example, the multivibrator 80 may be set to have a time constant of 30 microseconds, and the ratio of the resistor 66 to the resistor 64 is set at 0.65. That is, whenever the voltage at the tap T8 is at least 65 percent of the larger of the voltages appearing at the taps T7, T7–⅓, or T7–⅔, the output of the multivibrator 80 will be a pulse having a 30-microsecond duration. During this 30-microsecond pulse, the character recognition circuits 38a–n are enabled and can recognize which character the waveform in the delay line 32 represents.

Reference is now made to the solid line waveform 81 shown in the delay line 32 of FIG. 2. This solid line waveform 81 represents a normal "5" which has been scanned by the reading head 28. Further, this waveform is shown just prior to its reaching the proper position to be recognized by one of the character recognition circuits 38$a$–$n$. The one of the character recognition circuits 38$a$–$n$ which would recognize a "5" would do so at about the time peak 82 reaches the tap T8. This is about 40 microseconds after the lead point 84 reaches the tap T8.

If the character "5" was encoded on a corrective sticker pasted over previous encoding or had extraneous ink attached, the leading edge of the waveform shown in the delay line 32 might look like that shown in the dashed lines 86. In this case, it is possible that a different one of the character recognition circuits (for example, the one that recognizes the waveform for an "8") would recognize the waveform, since the peak 82 occurs about 40 microseconds after the lead point 88. This would be a misread.

In the prior art system, the only means for enabling the character recognition circuits 38$a$–$n$ would be the T8>1/6 comparator circuit 78. In this case, once the voltage at the tap T8 became equal to or greater than one sixth of the maximum voltage at any of the taps T1 to T7, such as the voltage at the peak 82, each of the character recognition circuits 38$a$–$n$ *would be enabled, and the misread could occur.*

Figure 3:
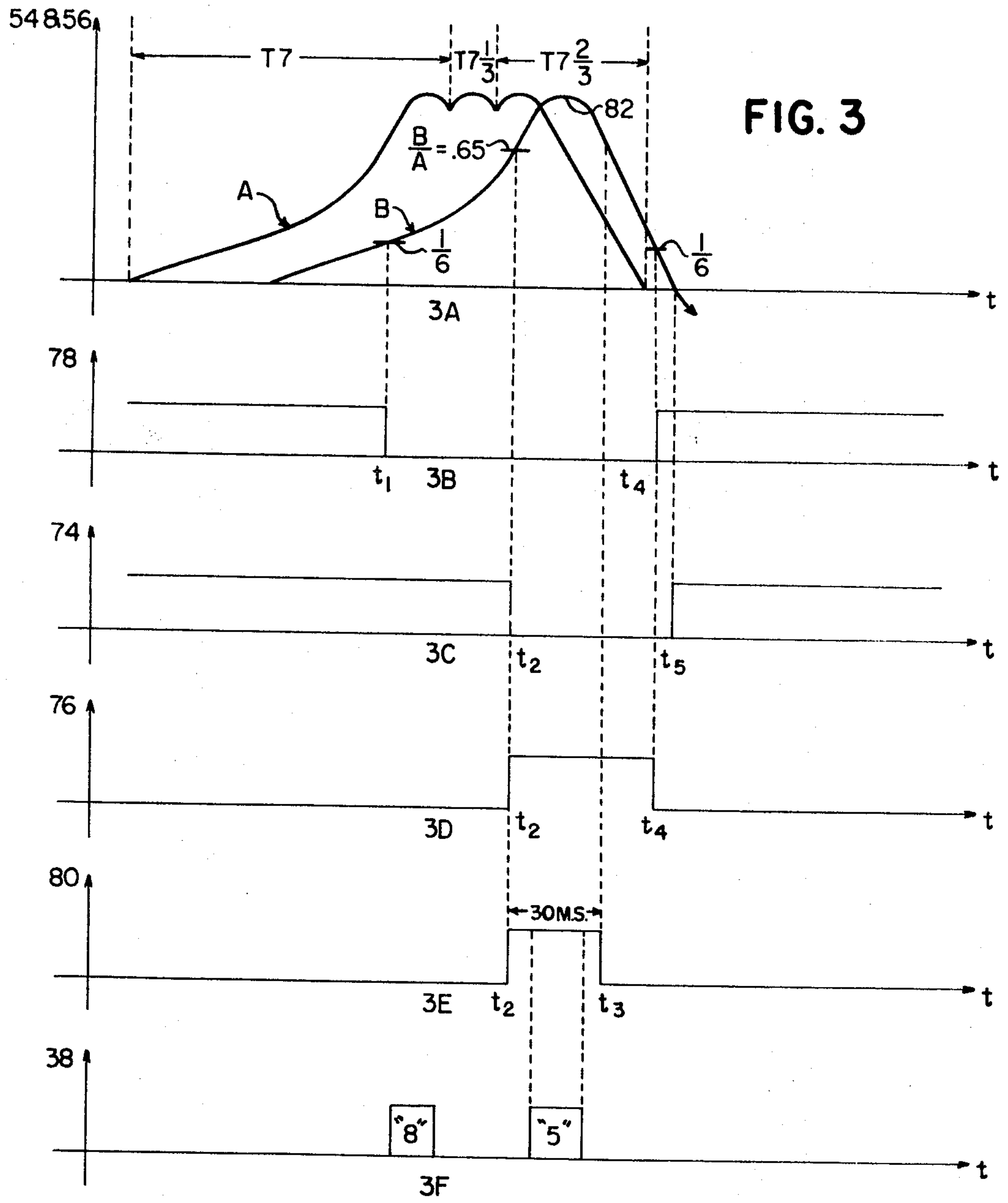
FIG. 3 represents a series of graphical illustrations useful in understanding the operation of the circuit shown in FIG. 2.

Reference is now made to FIG. 3, which shows several waveforms that aid in understanding how this invention can prevent the misread just described. FIG. 3A shows two analog waveforms A and B. The one designated A represents the output signal from the OR gate 56, and the one designated B represents the output signal from the amplifier 54. The waveform A represents, at different points, the signal determined by one of the three taps T7, T7-⅓, or T7-⅔, as shown in FIG. 3A. It should be noted that the polarity of the waveform B in FIG. 3A has been reversed for easier understanding of the operation of this invention. Further, it should be noted that the waveform marked B is at the same time as the signal appearing at the tap T8.

FIG. 3B shows the output of the comparator circuit 78 which occurs when the magnitude of the signal appearing at the tap T8 (waveform B) exceeds one sixth of the value of the maximum output. The pulse shown in FIG. 3B is wider by a considerable amount than would be the pulse if a normal "5" were being read by the scanning head 28.

Thus, if only the comparator circuit 78 were available to enable the character recognition circuits 38$a$–$n$, any time after the time designated $t_1$, one of the character recognition circuits could provide a null, and this would cause the apparatus to which these signals are applied to process the document.

FIG. 3F shows the nulls which can be produced by the character recognition circuits 38$a$–$n$ for the waveform B. Thus, due to the extra analog information on the leading edge of the character "5" waveform, it is possible that the document would be processed as if the "5" were an "8".

However, due to the inclusion of the remainder of the triggering circuit 42, the chances that this misread will occur are greatly reduced, because, before the character recognition circuits can be enabled, it is further necessary that the monostable multivibrator 80 be triggered, and this in turn requires that the output from the inverter 74 be low. Before the output of the inverter 74 can be made low, it is necessary for the current $i_2$ to be greater than the current $i_1$. Where one selects the ratio of the resistors 64 and 66 to be such that ratio of the magnitude of the voltage at the tap T8 must be at least 65 percent of the largest of the voltages at the taps T7, T7-⅓, or T7-⅔, the current $i_2$ remains less than the current $i_1$ after the time $t_1$ at which the comparator 78 begins providing the low signal. The output of the inverter circuit 74 is shown in FIG. 3C, and it is low between times $t_2$ and $t_5$.

By comparing FIGS. 3B and 3C, it is seen from FIG. 3D that the NAND gate 76 provides a high signal between the times designated $t_2$ and $t_4$. The leading edge of this signal, occurring at time $t_2$, triggers the monostable multivibrator 80, which in turn provides the 30-microsecond pulse shown in FIG. 3E. This pulse occurs between the times $t_2$ and $t_3$, and it is only between the times $t_2$ and $t_3$ that the character recognition circuits 38$a$–$n$ are enabled.

Referring now to FIG. 3F, where there are shown the null readings for the character "8" and the character "5", both of which could have been made on the waveform B shown in FIG. 3A, the first one of these null readings, the one for an "8", would be a misread, because a "5" was scanned by the head 28. However, since this null is not within the 30-microsecond enabling window provided by the multivibrator 80 (see FIG. 3E), although it is within the window provided by T8>1/6 comparator circuit 78 (see FIG. 3B), it will, in fact, be ignored by the character recognition circuits 38$a$–$n$. On the other hand, the null designated "5" is within the 30-microsecond enabling window, and thus the character circuits 38$a$–$n$ will recognize the waveform as a "5" and would provide an output at the proper output 40$a$–$n$. Thus the mechanical apparatus (not shown) will not process the "5" as an "8", as it could have in the prior art system.

I claim:

1. A magnetic ink character recognition system comprising:
means for scanning an article having at least one magnetized ink character thereon and for providing an analog signal corresponding to the said character;
a delay line having a plurality of tapped outputs, there being a delayed version of a signal applied to said delay line at each of said tapped outputs, said signals at said tapped outputs being delayed by differing amounts;
means for applying said analog signal to said delay line;
character recognition means responsive to the signals appearing at first selected ones of said tapped outputs for recognizing said character during a given time in which an enabling signal is applied thereto;
gating means responsive to the signals appearing at second selected ones of said tapped outputs for providing a signal having a magnitude equal to the largest of the magnitudes of the signals appearing at said second selected tapped outputs, said second selected outputs having signals thereat which are delayed by an amount more than the majority of the signals at said first selected outputs;
comparing means for comparing the magnitude of the signal appearing at one of said first selected tapped outputs with said gating means signal and for providing said enabling signal whenever the ratio of the magnitude of the signal appearing at said one tapped output to the magnitude of said gating means signal exceeds a preselected value, said signal at said one tapped output being delayed more than the signals at said second selected tapped outputs; and
means for applying said enabling signal to said character recognition means.

2. The invention according to claim 1
wherein each of said tapped outputs of said delay line is positioned to cause each succeeding tapped output signal to be delayed from the immediately preceding tapped output signal; and
wherein said second selected ones of said tapped outputs include at least two adjacent ones of said tapped outputs, one of which is positioned adjacent to said one tapped output, the signal appearing at said one tapped output being delayed by a greater amount than the signals at said one of said two adjacent tapped outputs.

3. The invention according to claim 2 wherein said comparing means includes a triggerable monostable multivibrator which, once triggered, provides a signal having a fixed duration, said multivibrator being triggered when said ratio exceeds said predetermined value.

4. The invention according to claim 2 wherein said enabling signal is provided for a fixed duration after said ratio exceeds said predetermined value.

5. The invention according to claim 2 wherein coarse timing means are further provided for providing a coarse timing signal whenever the magnitude of the signal appearing at said one of said tapped outputs exceeds a given value, said enabling signal being able to occur only while said coarse timing signal occurs.

6. The invention according to claim 5 wherein said comparing means includes a triggerable monostable multivibrator which, when triggered, provides a signal having a fixed duration, said multivibrator being triggered when said ratio exceeds said predetermined value.

7. The invention according to claim 2 wherein said comparing means includes:

an operational amplifier having two inputs and an output;

first coupling means including a first resistor for coupling the gating means signal to one of said operational amplifier inputs; and second coupling means including a second resistor for coupling the signal from said one tapped output to the other input of said operational amplifier, the ratio of said second resistor to said first resistor determining the ratio between said compared signals necessary to cause said comparing means signal to be provided.

8. The invention according to claim 7 wherein the signals applied to said two operational amplifier inputs have opposite polarities.

9. In combination:

utilization means;

means for providing a plurality of signals which are successively delayed versions of one another;

means for providing first selected ones of said signals to said utilization means;

gating means responsive to second selected ones of said plurality of signals for providing a signal having a magnitude equal to the largest of the then-existing magnitudes of said signals, at least two of the signals of said second selected signals not being included as part of said first selected signals; and comparing means for comparing said gating means signal with another one of said plurality of signals and for providing a signal when the ratio of said compared signals arrives at a predetermined value.

10. The invention according to claim 9 wherein said another one of said plurality of signals is delayed by an amount at least as great as each of said selected ones of said plurality of signals.

11. The invention according to claim 9 wherein said second selected ones of said plurality of signals exclude said another one of said plurality of signals.

12. The invention according to claim 9 wherein said second selected ones of said plurality of signals exclude said another one of said plurality of signals; and wherein said another one of said plurality of signals is delayed by an amount greater than each of said second selected ones of said plurality of signals.

13. The invention according to claim 9 wherein said comparing means signal lasts for a fixed time.

14. The invention according to claim 9 wherein said combination further includes course timing means for providing a signal whenever the magnitude of said another one of said plurality of signals exceeds a given value; and wherein said comparing means signal can occur only during the time said course timing means signal is provided.

15. The invention according to claim 14 wherein said comparing means signal lasts for a fixed time.